United States Patent
Evans et al.

(12) 
(10) Patent No.: US 6,542,683 B1
(45) Date of Patent: Apr. 1, 2003

(54) SUPPRESSION OF STIMULATED BRILLOUIN SCATTERING IN OPTICAL FIBER

(75) Inventors: Alan Frank Evans, Beaver Dams, NY (US); Carlton Maurice Truesdale, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/462,739

(22) PCT Filed: Jul. 7, 1998

(86) PCT No.: PCT/US98/14095

§ 371 (c)(1),
(2), (4) Date: Jan. 13, 2000

(87) PCT Pub. No.: WO99/04298

PCT Pub. Date: Jan. 28, 1999

Related U.S. Application Data

(60) Provisional application No. 60/052,616, filed on Jul. 15, 1997.

(51) Int. Cl.$^7$ ............................................. G02B 6/22
(52) U.S. Cl. ........................................................ 385/127
(58) Field of Search ................................. 385/123, 124, 385/126, 127; 65/385, 397, 398, 413–415

(56) References Cited

U.S. PATENT DOCUMENTS

| | | | |
|---|---|---|---|
| 4,265,515 A | * 5/1981 | Kao | |
| 4,344,670 A | * 8/1982 | Blankenship | |
| 4,413,882 A | * 11/1983 | Bailey et al. | |
| 4,691,991 A | * 9/1987 | Unger | 385/127 |
| 4,747,663 A | * 5/1988 | Huber | 385/127 |
| 5,170,457 A | * 12/1992 | Jen | 385/123 |
| 5,267,339 A | * 11/1993 | Yamauchi et al. | 385/123 |
| 5,835,655 A | * 11/1998 | Liu et al. | 385/124 |
| 5,848,215 A | * 12/1998 | Akasaka et al. | 385/123 |
| 5,851,259 A | * 12/1998 | Clayton et al. | 65/377 |
| 5,942,296 A | * 8/1999 | Oh et al. | 428/34.6 |
| 5,956,448 A | * 9/1999 | Smolka et al. | 385/124 |
| 6,275,638 B1 | * 8/2001 | Sasaoka et al. | 385/127 |

* cited by examiner

*Primary Examiner*—Rodney Bovernick
*Assistant Examiner*—Mike Stahl
(74) *Attorney, Agent, or Firm*—Svetlana Z. Short

(57) ABSTRACT

Suppression of stimulated Brillouin scattering (SBS) by broadening the energy spectrum of participating SBS photons and/or phonons is achieved in an optical fiber having a core with both radially nonuniform viscosity and CTE profiles provided by alternating layers of glass modifying dopants such as phosphorous and fluorine. The nonuniform thermal expansion and viscosity profiles impart a residual, permanent, nonuniform stress in the fiber. The SBS suppressing effect provided by the nonuniform stress can be controlled and enhanced by applying a uniform or nonuniform tensile force to the fiber as it is being drawn. A preform for the fiber is also disclosed.

10 Claims, 2 Drawing Sheets

SUPPRESSION OF STIMULATED BRILLOUIN SCATTERING IN OPTICAL FIBER

This application claims the benefit of Provisional application No. 60/052,616, filed Jul. 15, 1997.

BACKGROUND OF THE INVENTION

1. Field of the Invention

This invention generally relates to optical fiber, and particularly relates to optical fiber having increased power handling capacity due to the suppression of stimulated Brillouin scattering (SBS), and to a method for making said fiber and fiber preforms therefor.

2. Description of Related Art

Stimulated Brillouin scattering (SBS), an optical nonlinearity, limits the maximum optical power throughput of optical fiber transmission systems. As input power increases above what is known as the threshold power, the power that can be transmitted along the optical fiber reaches an upper limit. Any additional input power to the fiber scatters in the backward direction due to interaction with acoustic phonons rather than propagating in the forward, launch direction as a higher power signal. Thus SBS, as it is called, reduces the signal to noise ratio at the receiver and can cause the transmitter to become unstable due to the entry of reflected light. Moreover, the increasing use of optical amplifiers, solid state Nd:YAG lasers, and external modulation at ever increasing data rates over longer and longer distances all combine to exacerbate SBS in both digital and CATV applications.

SBS is an interaction of optical photons with acoustic phonons of the glass matrix. Techniques suggested in the literature to increase the threshold power, minimize the detrimental effects of SBS, and increase the power handling capacity of the fiber rely, e.g., on broadening either the photon energy spectrum of the source or the phonon energy spectrum of the glass to reduce the efficiency of the interaction. One reported method proposes changing the refractive index profile along the length of the fiber (axial direction) by varying the background fluorine concentration. Another proposes wrapping the fiber around a central rod to induce stress to change the energy distribution of acoustic phonons. Some disadvantages of changing the index of refraction along the axial direction of the fiber, and tight fiber wrapping, include undesirable changes in other fiber properties and increased fatigue which impacts fiber lifetime. Wada, et al, *Suppression of stimulated Brillouin scattering by intentionally induced periodical residual-strain in single-mode optical fibers*, in Proceedings of European Conference on Optical Comm. 1991, paper MoB1, propose applying draw tension to induce a periodical residual strain along the fiber length that broadens the phonon energy distribution and reduces the SBS interaction. This reference discloses a step-index fiber having a $SiO_2$ core and a $F-SiO_2$ cladding. Because the F-doped cladding has a lower viscosity, the draw tension is mainly applied to the core resulting in a deviation of the residual strain as a function of draw tension. The residual strain broadens the effective gain linewidth of the fiber by continuously shifting the central frequency of the Brillouin gain spectrum. This reference indicates that draw tension-induced SBS suppression in germanium-doped silica core/undoped silica cladding single-mode fiber is negligible. A more recent publication, Headly et al., OFC '97, Paper WL25, Tech. Digest, describes a modest 3 dB increase in threshold power for this type of fiber for optimized draw tension profile and reported maximum allowable draw tension variation.

SUMMARY OF THE INVENTION

Accordingly, the invention is directed to an optical fiber having increased power handling capacity, and to a fiber preform from which such a fiber can be drawn, having a radially nonuniform coefficient of thermal expansion (CTE) and viscosity profile, which imparts a permanent differential stress profile through the visco-elastic and thermal-elastic properties of the resultant glass structure. In turn, the stress profile alters the local density to broaden the range of acoustic energies (or velocities) which acts to suppress SBS and increase the power handling capacity of the fiber. In addition, the invention relates to a method for producing such fiber and preform, and to a method for enhancing the SBS suppression effect of the permanent differential stress in the fiber.

Additional features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof as well as the appended drawings.

To achieve these and other advantages and in accordance with the purpose of the invention, an embodiment of the invention describes an optical waveguide fiber having increased power handling capacity comprising a core having radially nonuniform CTE and viscosity profiles in a part of the core (hereinafter, the "doped region"), between the center and an outermost region of the core; and a cladding surrounding the outermost region of the core. In an aspect of this embodiment, the part of the core having the radially nonuniform CTE and viscosity profiles includes immediately adjacent annuli of alternating higher and lower CTE's and viscosities provided by dopant layers of different compositions (i.e., providing differing mechanical structure). The fiber has a substantially constant and/or uniform effective refractive index profile along its propagation axis (i.e., in the axial direction). In another aspect of this embodiment, annular regions (layers) consisting essentially of $SiO_2$ doped with $GeO_2$, $GeO_2+P_2O_5$, or $GeO_2+F$, will exhibit a higher CTE and, in most cases, a lower viscosity, than adjacent layers consisting essentially of $SiO_2$ or $SiO_2+F$. In a further aspect of this embodiment, the doped region is substantially located at a radial distance from the center of the core where the value of the area-averaged optical power peak is a maximum, the peak being proportional to $|E|^2 rdr$, where (E) represents the electric field, (r) is the radius of the fiber core, and (dr) is the differential radius.

In another embodiment, the invention describes a fiber precursor, referred to hereinafter as a (fiber) preform, from which an optical waveguide fiber having an increased power handling capacity can be drawn. The preform includes a core region having radially nonuniform CTE and viscosity profiles in a part of the core region between the core center and an outermost region of the core (doped region), and a cladding composition surrounding the outermost region of the core.

In an aspect of this embodiment, the doped region includes immediately adjacent annular compositional layers of differing CTE's and viscosities provided by selected dopants. The preform has a substantially constant and/or uniform effective refractive index profile in the axial direction. As it is well known to those skilled in the art that the optical and compositional characteristics of a fiber mimic those characteristics of the preform from which it is drawn, the preform core region will likewise have layers of $SiO_2$ doped with $GeO_2$, $GeO_2+P_2O_5$, or $GeO_2+F$, alternating with layers of $SiO_2$ or $SiO_2+F$ to provide the radially nonuniform profiles of CTE and viscosity. Although, in each of the embodiments described above, the core modifying dopants include phosphorous and fluorine, other dopants that provide a similar effect will be known to those skilled in the art.

Preferred layer compositions and dopant levels will be dictated by the desired interaction of the thermal-elastic and visco-elastic-induced stress in the fiber. The resultant radial strain, $\Delta L/L$ (where L=the thickness of a particular layer) at the interfaces of the alternating layers, should be at least >0.001, and preferably >0.002, and will be upper bound by the mechanical fatigue of the glass.

A further embodiment of the invention provides a method for making an optical waveguide fiber having increased power handling capacity, involving the steps of providing a fiber preform having a core region with radially nonuniform CTE and viscosity profiles and a substantially uniform refractive index profile in an axial direction; heating an end of the preform to a temperature sufficient to draw fiber therefrom; and drawing fiber therefrom. In an aspect of this embodiment, the method includes applying either a uniform or nonuniform tensile force to the fiber as it is being drawn. The tensile force is in the range of about 25 to 200 gm.

It is to be understood that both the foregoing general description and the following detailed description are exemplary and are intended to provide further explanation of the invention as claimed.

The accompanying drawings are included to provide a further understanding of the invention and are incorporated in and constitute a part of this specification, illustrate embodiments of the invention and together with the description serve to explain the principles of the invention.

DETAILED DESCRIPTION OF A PREFERRED EMBODIMENT OF THE INVENTION

Figure 1:
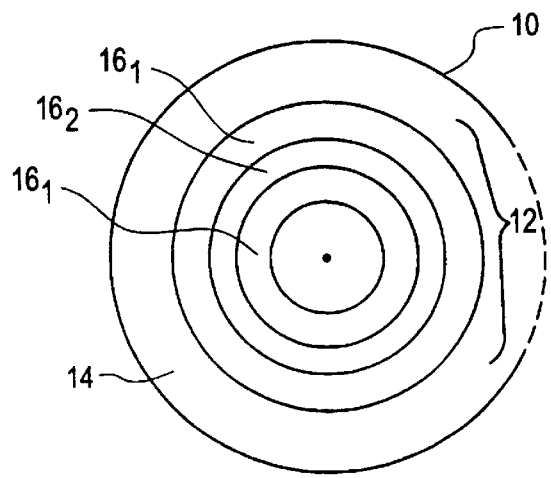
FIG. 1 is a schematic cross sectional view of a fiber embodiment of the invention showing the doped layers in the core/cladding region.

An optical waveguide fiber is disclosed that has radially nonuniform CTE and viscosity profiles which result in a permanent, nonuniform residual stress in the fiber for reducing SBS. A method for making such a fiber and a fiber preform is also disclosed, as well as a method for enhancing the SBS suppression effect in such a fiber as it is being drawn.

Reference will now be made in detail to the present preferred embodiments of the invention, examples of which are illustrated in the accompanying drawings.

Briefly, the continuous wave (CW) stimulated Brillouin scattering threshold power, $P_{Th}$, for optical fiber is defined by the expression:

$$P_{TH} = 21 A_{eff}/g_b L_{eff} \quad (1)$$

where $A_{eff}$ is the effective core area, $L_{eff}=(1-e^{(-\alpha L)}/\alpha)$ is the effective length where L is the fiber length and $\alpha$ is the optical attenuation, and $g_b(v_B)=[2\pi n^7 \rho^2_{12}]/[c\lambda^2 \rho_o v_a \Delta v_B]$ is the gain coefficient or peak value of the Brillouin gain spectrum, n is the refractive index, $\rho_{12}$ is the elasto-optic coefficient, c is the speed of light, $\rho_o$ is the material density, $V_a$ is the acoustic velocity, $v_B$ is the frequency shift of the backscattered Stokes light, and $_\Delta v_B$ is the Brillouin spectral linewidth (typically around 35 MHz). Since the growth of the scattered Stokes wave is exponentially dependent on the gain coefficient, and since the gain coefficient is independent of the effective area, fiber length, and attenuation, it is a useful parameter to use to compare SBS in different fibers. Table I shows the gain coefficients for fibers drawn from the same blank for varied draw tension and cladding diameters. Results are presented for uniform draw tensions of 25 gm, 90 gm and 160 gm, and for variable tensions over what we believe is substantially a maximum draw-process limited range. A rather modest maximum gain difference of 28% between the 90 gm uniform tension fiber (B) and the 25–160 gm linearly increasing tension fiber (D) is reported. The spectrum of the backscattered Stokes wave which, for CW light, is equivalent to the spectral linewidth of the SBS gain, is related to the energy distribution of acoustic phonons in the fiber, and provides a further understanding about the relative insensitivity of draw tension on SBS gain. Table II shows the central frequency for 25 gm (A), 90 gm (B) and 160 gm (C) tension dispersion shifted (DS) fiber. The difference in peak frequency between 25 gm and 160 gm is 47 MHz. Using a Brillouin linewidth of 35 MHz for a uniform draw tension fiber, an increase in linewidth to 47 MHz corresponds to a 26% difference in gain coefficient between a uniform tension fiber (e.g., B in Table I) and a 25–160 gm tension fiber (e.g., D in Table I), compared to the measured value of 28%.

TABLE I

| Fiber Segment | Diameter, Tension | Mode field Diam ($\mu$m) | $A_{elf}$ ($\mu$m) $\times 10^{-12}$ | $P_{th}$ (dBm) | $g_b$ (m/W) $\times 10^{-11}$ | Attenuation (dB/km) | Length (km) |
|---|---|---|---|---|---|---|---|
| A | 125 $\mu$m 25 gm | 8.41 | 55.50 | 8.78 | 3.87 | 0.41 | 5.00 |
| B | 125 $\mu$m 90 gm | 8.33 | 54.43 | 8.51 | 3.96 | 0.37 | 5.00 |
| C | 125 $\mu$m 160 gm | 8.13 | 51.93 | 8.65 | 3.64 | 0.36 | 5.00 |
| D | 125 $\mu$m 160 gm and less | 8.13 | 51.94 | 8.99 | 2.86 | 0.39 | 6.30 |

TABLE I-continued

| Fiber Segment | Diameter, Tension | Mode field Diam ($\mu$m) | $A_{eff}$ ($\mu m$) × $10^{-12}$ | $P_{th}$ (dBm) | $g_b$ (m/W) × $10^{-11}$ | Attenuation (dB/km) | Length (km) |
|---|---|---|---|---|---|---|---|
| E | 125 $\mu$m up to 160 gm | 8.37 | 54.98 | 8.41 | 3.42 | 0.37 | 6.30 |
| F | 140 $\mu$m | 7.78 | 47.50 | 9.83 | 3.68 | 0.37 | 3.22 |
| G | 140–100 $\mu$m 160 gm | 8.48 | 56.43 | 10.91 | 3.34 | 0.37 | 3.30 |
| H | 100 $\mu$m 160 gm | 9.18 | 66.13 | 10.47 | 3.03 | 0.35 | 5.00 |
| I | 100–150 $\mu$m 160 gm | 8.48 | 56.43 | 10.18 | 3.30 | 0.28 | 3.90 |

TABLE II

| Fiber Segment | Diameter/Tension | Peak Frequency (Ghz) |
|---|---|---|
| A | 125 $\mu$m/25 gm | 12.445 |
| B | 125 $\mu$m/90 gm | 12.423 |
| C | 125 $\mu$m/160 gm | 12.398 |

In light of the foregoing observations, there is a recognized need for a method for more effectively suppressing SBS in an optical fiber, and for a fiber and a precursor thereof (e.g., fiber preform) that respond more favorably to SBS suppression techniques.

The resultant stress in the fiber is directly proportional the strain where the proportionality constant is known as the elastic modulus. This stress alters the local material density which changes the acoustic velocity to shift the Brillouin frequency (see Hibino, et al, *Evaluation of residual stress and viscosity in SiO2/F—SiO2 clad single-mode optical fibers from Brillouin gain spectra,* J. Applied Physics, 66 (9), pp. 4049–4052, (1989)). If there is a range in the magnitude of the strain, $\Delta L/L$, as envisioned with layers of alternating mechanical properties, then there will be an effective broadening of the Brillouin linewidth instead of merely a frequency shift. As seen from Equation (1) above, the threshold power is directly proportional to the Brillouin spectra linewidth. Hence, a broadening from the linewidth from 35 MHz to 70 MHz will increase the threshold power by 2 times (3 dB). A residual strain of at least 0.001, and preferably >0.002 within the optical carrying cross-section of the fiber will achieve these results. For maximum benefit, we believe the strain should be distributed throughout the area-averaged optical power peak.

Stress becomes introduced into the glass matrix during fiber processing. There is a thermal expansion mismatch ($\Delta$CTE) after the glass is consolidated from the deposited soot on the preform. If neighboring annular regions of material have different coefficients of thermal expansion, then they contract by different amounts as the glass cools down. The difference in volumetric compression, $\Delta V/V$, results in stress via the bulk modulus of elasticity of the material. This in turn sets up a radial strain, $\Delta L/L$, throughout the core region of the waveguide. The magnitude of the strain is proportional to the linear expansion coefficient and the temperature difference between the glass when it sets up and can support stress, and room temperature. For fused silica waveguides, stress begins to freeze in at a viscosity below approximately $10^{12}$ poises; i.e., at approximately 1300° C. For an exemplary target strain of 0.2%, this implies a thermal expansion coefficient mismatch between adjacent layers of approximately $5 \times 10^{-7}/°$ C. This in turn defines the minimum dopant concentration to achieve this CTE mismatch. For example, the CTE of fused silica is $5 \times 10^{-7}/°$ C. Doping the silica with about 5 mole % $GeO_2$, or about 3 mole % $P_2O_5$, increases the CTE to $10 \times 10^{-7}/°$ C. The CTE dependence on fluorine doping is nonlinear with concentration but reaches a minimum CTE of about $2.5 \times 10^{-7}/°$ C. at about 5 mole % concentration. The minimum dopant concentration levels needed for a strain that will significantly alter the SBS threshold power are within the range of values possible based on other processing considerations well known to those skilled in the art. Table III presents doped region layer compositions and dopant values (in weight %) for the higher and lower CTE layers, respectively, according to an embodiment of the invention.

TABLE III

| | Higher CTE Layers | | | Lower CTE Layers | |
|---|---|---|---|---|---|
| | A | B | C | D | E |
| $SiO_2$ | 57–92 | 58–92 | 60–92 | 100 | 98–100 |
| $GeO_2$ | 8–40 | 8–40 | 8–40 | 0 | 0 |
| $P_2O_5$ | 0–3 | 0 | 0 | 0 | 0 |
| $F_2$ | 0 | 0–2 | 0 | 0 | 0–2 |

As the fiber is drawn down to its final diameter, it leaves the furnace and undergoes large temperature gradients and rapid cooling. This quenching freezes additional stress into the glass matrix. The magnitude of the stress is dependent on the draw speed and hence the cooling rate. An additional stress component comes from the fiber draw tension which is typically between about 25 to 200 gm. If, e.g., the core glass has a higher viscosity than the cladding, then it hardens and sets up faster. It elastically carries the load of the draw tension until the cladding glass sets up. Once the load is released, the cladding will force the core into a compressional state. This is shown schematically in FIG. 3. A fiber with a $SiO_2$ core and a fluorine-doped $SiO_2$ cladding exhibits a more significant SBS effect from draw tension than a $GeO_2+SiO_2$ core/$SiO_2$ cladding fiber. Multiple annular layers of varying dopant compositions according to the invention will allow the higher viscosity layers to support the load of draw tension. Once the load is released, the inter-adjacent lower viscosity layers will be compressed. Hence, multiple layers of alternating mechanical structure not only provide for reduced SBS under variable draw tension conditions, but also under a constant draw tension, which is a process that is easier to control.

Figure 2:
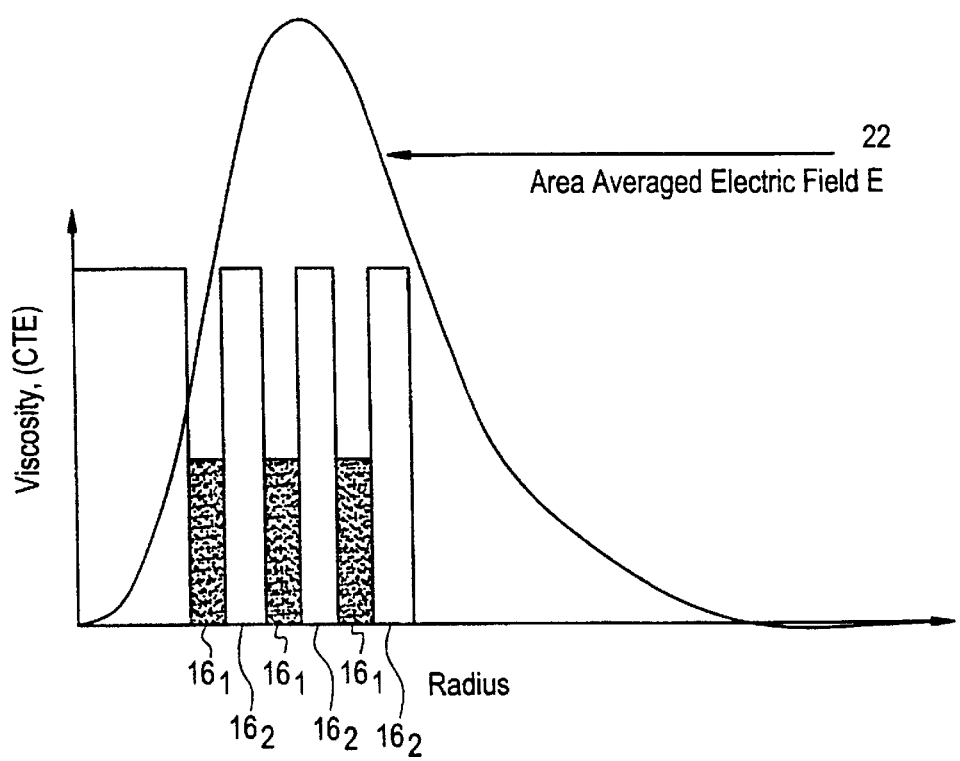
FIG. 2 shows in graphical form the doped region in an exemplary embodiment of the invention.

In a preferred embodiment of the invention as shown in cross section in FIG. 1, an optical waveguide fiber 10 having an increased power handling capacity comprises a core region 12, typically germanosilicate or germano-alumina silicate, a cladding region 14 surrounding the core region 12, and at least two immediately adjacent dopant layers $16_1$, $16_2$, having different CTE and viscosity values, respectively. Dopant layer $16_1$ preferably has a higher CTE and a generally lower viscosity, provided by a composition selected from the group consisting essentially of $SiO_2+GeO_2+P_2O_5$, $SiO_2+GeO_2+F_2$, and $SiO_2+GeO_2$; while dopant layer $16_2$ preferably has a lower CTE and generally higher viscosity provided by a composition selected from the group consisting essentially of $SiO_2$, and $SiO_2+F_2$. These alternating dopant layers impart radially nonuniform viscosity and thermal expansion profiles to the fiber in the doped region, which provide the fiber with a permanent, residual, nonuniform stress. The doped region is preferably located at a radial distance from the core center in the region of the area-averaged optical power peak; i.e., where $[|E|^2rdr]$ is a maximum, where (E) represents the electric field, (r) is the radius of the core, and (dr) is the differential radius. This is illustrated in FIG. 2 which shows a plot of viscosity (and CTE) as a function of fiber radius. Reference numeral 22 represents the area averaged electric field, E, and $16_n$ represents regions of higher and lower viscosity and/or thermal expansion.

The layers of different dopant compositions preferably will not affect the waveguiding properties of the fiber, achieved by careful choice of the dopants and the layer thicknesses. The dopants can be chosen such that they change the thermal-elastic and visco-elastic properties of the glass but have a minimal effect on the refractive index. Dopants are preferably selected that change the base silica refractive index in equal but opposite signs. The layer thicknesses in the fiber should be less than the wavelength of light (nominally 1.5 μm) and preferably in the range from about 0.05–0.5 μm. The interface between the alternating layers $16_1$ and $16_2$ will preferably have a residual strain, $\Delta L/L$, $\geq 0.002$.

The viscosity and CTE modifying dopant layers create a nonuniform radial stress profile, but do not modify the axial refractive index. Advantageously, the resultant stress profile same broadens the energy spectrum at every cross-sectional location along the fiber. Since optical properties do not change along the axial direction of the fiber, any length will have the SBS suppression properties built-in. Thus, e.g., issues of fiber management, i.e., type and order within a transmission link, are reduced. Variable draw tension along the length of the fiber will also serve to enhance the SBS suppression property.

During preform making, the glass soot can be consolidated on a pass by pass basis preferably using either the well known plasma (MCVD) or inside chemical vapor deposition processes which provide for sintering of the glass during laydown. This reduces dopant inter-diffusion and provides that the dopant layers remain mechanically distinct from their adjacent neighbors. Alternatively, the layers created in the glass preform before fiber draw down can be made thick. The thickness of the layers can be tailored such that the average radial refractive index profile meets a particular optical design although the local refractive index within the individual layers may be different. Thinner layers within the fiber also increase the residual strain created by tension variations. Equation (1) of Wada et al. *Suppression of stimulated Brillouin scattering by intentionally induced periodical residual-strain in single-mode optical fibers*, in Proceedings of European Conference on Optical Comm., 1991, paper MoB1, can be used to determine the layer cross sectional dependence on draw tension deviation, δF. That paper, however, considers the core and cladding cross-sectional areas as a whole. In the present invention, the cross-sectional areas can be generalized to be that of the individual annuli. Assuming equal layer area cross sections, A, and equal Young's moduli, E, the equation for strain, δe, reduces to $\delta e = \delta F(1+\eta_2 A/\eta_1 A)^{-1}/2AE$ where $\eta_{2,1}$ are the viscosities of two adjacent layers. Smaller cross sectional area, A, means larger strain deviation, δe, for a given tension variation, δF. This relationship continues to hold for unequal cross sections and Young's moduli.

Figure 3:
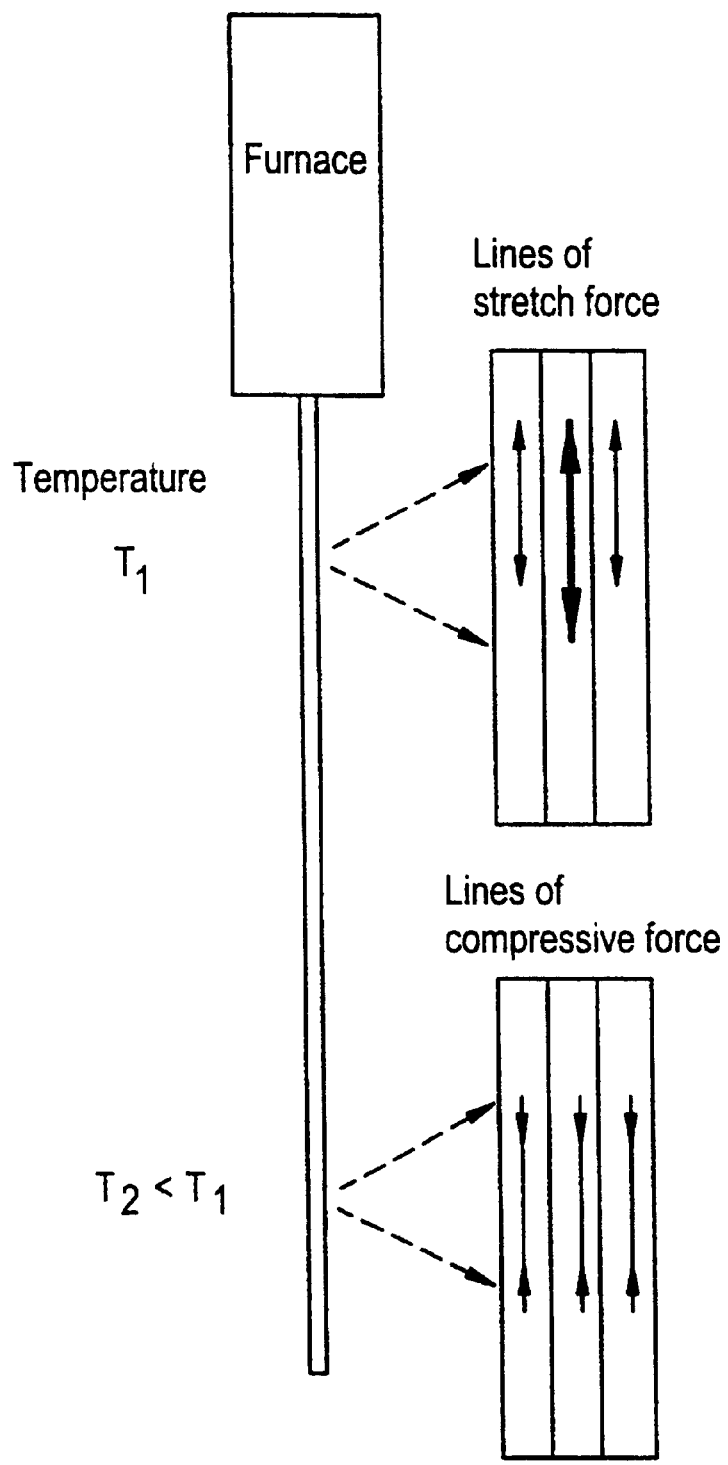
FIG. 3 schematically shows the radial variation of the stress in an optical fiber with viscosity and CTE mismatched dopant layers due to draw tension according to an embodiment of the invention.

During the fiber drawing process, fiber deformation creates a longitudinal strain and corresponding stress along the pulling direction. The ratio of stress to strain is referred to as the elastic modulus. If the cross sectional area, draw tension, viscosity, and glass material modulus are uniform, the resultant stress will be uniform. However, in an embodiment of the invention as shown in FIG. 3, residual, permanent, tensile or compressive forces are set up in the doped region due to the nonuniform glass modulus, cross sectional area and/or viscosity between the rings provided by the dopant layers. In such a viscosity mismatched fiber, the phonon energy spectrum becomes broadened and the SBS threshold power increases. The effect of the radially nonuniform viscosity profile on SBS suppression is enhanced by the location of the doped region in the composite fiber structure. The radial location most sensitive to index perturbations is also most preferable for the location of the viscosity-induced residual stress. As it is well understood by those skilled in the art, the refractive index profile of an optical fiber drawn from a preform mimics the refractive index profile of the precursor.

In another embodiment, the invention provides a method for making an optical fiber waveguide having an increased power handling capacity, comprising the steps of making a fiber preform from which a cladded fiber can be drawn that includes a core region having radially nonuniform thermal expansion and viscosity profiles, and heating the preform in a fiber drawing furnace and drawing fiber therefrom while applying a tensile force to the fiber as it is being drawn. Techniques for making preform and drawing optical fiber therefrom are well known to those skilled in the art and require no further discussion The effects of both uniform and nonuniform tensile forces can be seen from Table I which shows the gain coefficients for fibers drawn from the same blank for varied draw tension and cladding diameters. Uniform draw tensions of 25 gm, 90 gm and 160 gm, and variable tensions from 25 gm to 160 gm are reported. Table II shows the central frequency for 25 gm (A), 90 gm (B) and 160 gm (C) tension dispersion shifted (DS) fiber. The difference in peak frequency between 25 gm and 160 gm is 47 MHz Using a Brillouin linewidth of 35 MHz for a uniform draw tension fiber, an increase in linewidth to 47 MHz corresponds to a 26% difference in gain coefficient between a uniform tension fiber (e.g., B in Table I) and a 25–160 gm tension fiber (e.g., D in Table I.

It will be apparent to those skilled in the art that various modifications and variations can be made in the apparatus and method of the present invention without departing from the spirit or scope of the invention. Thus, it is intended that the present invention cover the modifications and variations of this invention provided they come within the scope of the appended claims and their equivalents.

We claim:

1. An optical waveguide fiber having increased power handling capacity, comprising:

a core region including a doped region consisting essentially of at least one first annular compositional layer having a CTE and a viscosity that are substantially uniform in an axial direction, and at least one second annular compositional layer immediately adjacent said first layer having a different CTE and a different viscosity than said first layer that are substantially uniform in an axial direction, wherein each of said first and second layers has a thickness of 0.05 μm to 0.5 μm; and a cladding region surrounding an outermost part of said core region, whereby the fiber exhibits a permanent radially nonuniform CTE and viscosity profile.

2. The fiber of claim 1 wherein said first and second layers form a continuous plurality of alternating first and second layers in said doped region.

3. An optical waveguide fiber having increased power handling capacity, comprising:

a core region including a doped region consisting essentially of at least one first annular compositional layer having a CTE and a viscosity that are substantially uniform in an axial direction, and at least one second annular compositional layer immediately adjacent said first layer having a different CTE and a different viscosity than said first layer that are substantially uniform in an axial direction; and a cladding region surrounding an outermost part of said core region, whereby the fiber exhibits a permanent radially nonuniform CTE and viscosity profile, wherein said doped region is substantially located at a radial distance from the center of the core where an area-averaged optical power peak, proportional to $|E|^2 r dr$, has a maximum value, where (E) represents an electric field value, (r) is the radius of the core, and (dr) is the differential radius.

4. The fiber of claim 3 wherein the first layers have a higher CTE and a lower viscosity than the second layers.

5. An optical waveguide fiber having increased power handling capacity, comprising:

a core region including a doped region consisting essentially of at least one first annular compositional layer having a CTE and a viscosity that are substantially uniform in an axial direction, and at least one second annular compositional layer immediately adjacent said first layer having a different CTE and a different viscosity than said first layer that are substantially uniform in an axial direction, wherein each of said first and second layers has a thickness of 0.05 $\mu$m to 0.5 $\mu$m; and a cladding region surrounding an outermost part of said core region, whereby the fiber exhibits a permanent radially nonuniform CTE and viscosity profile, wherein the first layer is selected from a group consisting essentially of:

$SiO_2+GeO_2+P_2O_5$;

$SiO_2+GeO_2+F_2$;

$SiO_2+GeO_2$; and the second layer is selected from a group consisting essentially of:

$SiO_2$; and $SiO_2+F_2$, and wherein the composition consisting essentially of $SiO_2+GeO_2+P_2O_5$ consists essentially (in weight %) of (57–92) $SiO_2$, (8–40) $GeO_2$, and (0–3) $P_2O_5$; the composition consisting essentially of $SiO_2+GeO_2+F_2$ consists essentially (in weight %) of (58–92) $SiO_2$, (8–40) $GeO_2$, and (0–2) $F_2$; the composition consisting essentially of $SiO_2+GeO_2$ consists essentially (in weight %) of (60–92) $SiO_2$ and (8–40) $GeO_2$; and, the composition consisting essentially of $SiO_2+F_2$ consists essentially (in weight %) of (98–100) $SiO_2$ and (0–2) $F_2$.

6. An optical waveguide fiber having increased power handling capacity, comprising:

a core region including a doped region consisting essentially of at least one first annular compositional layer having a CTE and a viscosity that are substantially uniform in an axial direction, and at least one second annular compositional layer immediately adjacent said first layer having a different CTE and a different viscosity than said first layer that are substantially uniform in an axial direction; and a cladding region surrounding an outermost part of said core region, whereby the fiber exhibits a permanent radially nonuniform CTE and viscosity profile, wherein the first layer is selected from a group consisting essentially of:

$SiO_2+GeO_2+P_2O_5$;

$SiO_2+GeO_2+F_2$; and the second layer is selected from a group consisting essentially of:

$SiO_2$; and $SiO_2+F_2$, wherein each of said first and second layers is less than 0.5 $\mu$m thick.

7. An optical waveguide fiber having increased power handling capacity, comprising:

a core region including a doped region consisting essentially of at least one first annular compositional layer having a CTE and a viscosity that are substantially uniform in an axial direction, and at least one second annular compositional layer immediately adjacent said first layer having a different CTE and a different viscosity than said first layer that are substantially uniform in an axial direction, wherein each of said first and second layers has a thickness of 0.05 $\mu$m to 0.5 $\mu$m; and a cladding region surrounding an outermost part of said core region, whereby the fiber exhibits a permanent radially nonuniform CTE and viscosity profile having a residual strain, $\Delta L/L$, of at least 0.001 at an interface of the first and second layer.

8. The fiber of claim 7 having a residual strain, $\Delta L/L$, greater than 0.002 at an interface of the first and second layer and less than a value exceeding a mechanical failure of the fiber.

9. An optical waveguide fiber having an increased power handling capacity, comprising:

a core having both a radially nonuniform CTE profile and viscosity profile in a part of said core intermediate a center and an outermost region of the core; and a cladding surrounding the outermost region of the core, wherein the radially nonuniform part of the core is located at a radial distance from the center of the core where an area-averaged optical power peak, proportional to $|E|^2 r dr$, has a maximum value, where (E) represents an electric field value, (r) is the radius of the core, and (dr) is the differential radius.

10. The fiber of claim 9 wherein the radially nonuniform part of the core includes at least one annular layer having a composition selected from a group consisting essentially of:

$SiO_2+GeO_2+P_2O_5$;

$SiO_2+GeO_2+F_2$; and $SiO_2+GeO_2$; and at least one immediately adjacent annular layer having a composition selected from a group consisting essentially of:

$SiO_2$; and $SiO_2+F_2$.

* * * * *